United States Patent
Antipa

(10) Patent No.: US 10,650,187 B2
(45) Date of Patent: May 12, 2020

(54) VISUAL PATH RESOLUTION IN A CONTEXT SEPARATED AUTHORING ENVIRONMENT OF A REST- AND COMPONENT-BASED CONTENT MANAGEMENT SYSTEM

(71) Applicant: Adobe Inc., San Jose, CA (US)

(72) Inventor: Damien Antipa, Saint-Louis (FR)

(73) Assignee: ADOBE INC., San Jose, CA (US)

(*) Notice: Subject to any disclaimer, the term of this patent is extended or adjusted under 35 U.S.C. 154(b) by 217 days.

(21) Appl. No.: 14/051,739

(22) Filed: Oct. 11, 2013

(65) Prior Publication Data

US 2015/0106695 A1    Apr. 16, 2015

(51) Int. Cl.
*G06F 17/22* (2006.01)
*G06F 40/14* (2020.01)
*G06F 40/154* (2020.01)

(52) U.S. Cl.
CPC ............ *G06F 40/14* (2020.01); *G06F 40/154* (2020.01)

(58) Field of Classification Search
CPC ...... G06F 17/24; G06F 17/25; G06F 17/2247; G06F 17/227; G06F 17/3089; G06T 11/60; A63F 2300/5553; A63F 2300/6623
USPC ............................. 715/201, 202, 230, 255
See application file for complete search history.

(56) References Cited

U.S. PATENT DOCUMENTS

| | | | | |
|---|---|---|---|---|
| 7,392,510 | B1* | 6/2008 | Treder | G06F 17/3089 709/224 |
| 2002/0149615 | A1* | 10/2002 | Rajarajan | G06F 9/5055 715/738 |
| 2010/0250706 | A1* | 9/2010 | Burckart | H04L 67/02 709/219 |
| 2010/0251143 | A1* | 9/2010 | Thomas | G06F 16/958 715/760 |
| 2012/0290920 | A1* | 11/2012 | Crossley | G06F 11/3664 715/234 |
| 2013/0019189 | A1* | 1/2013 | Stewart | G06F 16/958 715/760 |
| 2013/0227014 | A1* | 8/2013 | Song | H04L 67/025 709/204 |
| 2015/0149916 | A1* | 5/2015 | Mendez | G06F 17/30873 715/738 |

* cited by examiner

*Primary Examiner* — Andrew R Dyer
*Assistant Examiner* — Jenq-Kang Chu
(74) *Attorney, Agent, or Firm* — Finch & Maloney PLLC

(57) ABSTRACT

Techniques are disclosed for providing visual path resolution in a context separated authoring environment of a REST- and component-based content management system. A web page editor is activated for editing a web page having a plurality of Document Object Model components. A structured document is generated and configured to present the web page components and at least a portion of the web page editor in a common frame of a browser window, as well as visual indications of regions of the web page that contain one or more of the components. In response to receiving an input that selects one of the components, the structured document is updated to present information about a property of the selected component, such as a path to a location of the selected component and/or a type of the selected component, in the same region of the web page that contains the selected component.

20 Claims, 6 Drawing Sheets

Title

Menu Bar

Section 1

Lorem ipsum dolor sit amet, consectetur adipisicing elit, sed do eiusmod tempor incididunt ut labore et dolore magna aliqua.

Section 2

Ut enim ad minim veniam, quis nostrud exercitation ullamco laboris nisi ut aliquip ex ea commodo consequat.

100

Section 3

Duis aute irure dolor in reprehenderit in voluptate velit esse cillum dolore eu fugiat nulla pariatur.

Section 4

Excepteur sint occaecat cupidatat non proident, sunt in culpa qui officia deserunt mollit anim id est laborum.

Section 5

Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo.

Section 6

Nemo enim ipsam voluptatem quia voluptas sit aspernatur aut odit aut fugit, sed quia consequuntur magni dolores eos qui ratione voluptatem sequi nesciunt.

Fig. 2

VISUAL PATH RESOLUTION IN A CONTEXT SEPARATED AUTHORING ENVIRONMENT OF A REST- AND COMPONENT-BASED CONTENT MANAGEMENT SYSTEM

FIELD OF THE DISCLOSURE

This disclosure relates generally to the field of data processing, and more particularly, to techniques for providing visual path resolution of web page components in a context separated authoring environment.

BACKGROUND

Representational state transfer ("REST") is a software architecture for distributed systems, such as the World Wide Web. In a REST architecture, servers hold resources such as web page content, documents, images and other types of information that are addressable by a client. A client wishing to create or modify a resource sends data representing the resource to the server, which stores the data in a repository such as a database. A Content Management System (CMS) is a computer program that allows users to, among other things, edit and maintain the resources via a graphical user interface (GUI). Some CMS applications execute on the server and interact with a browser executed by the client. Such CMS applications can provide GUI-based authoring and editing tools that are operable using the existing functionality of the browser, for example, in the form of a Hypertext Markup Language (HTML) document or other structured document that is rendered by the browser. Some such authoring tools can be rendered in a separate frame of a browser window displaying the resource, or in an entirely separate browser window.

BRIEF DESCRIPTION OF THE DRAWINGS

FIG. 2 illustrates an example graphical user interface of a web browser in accordance with an embodiment of the present invention.

DETAILED DESCRIPTION

Figure 1:
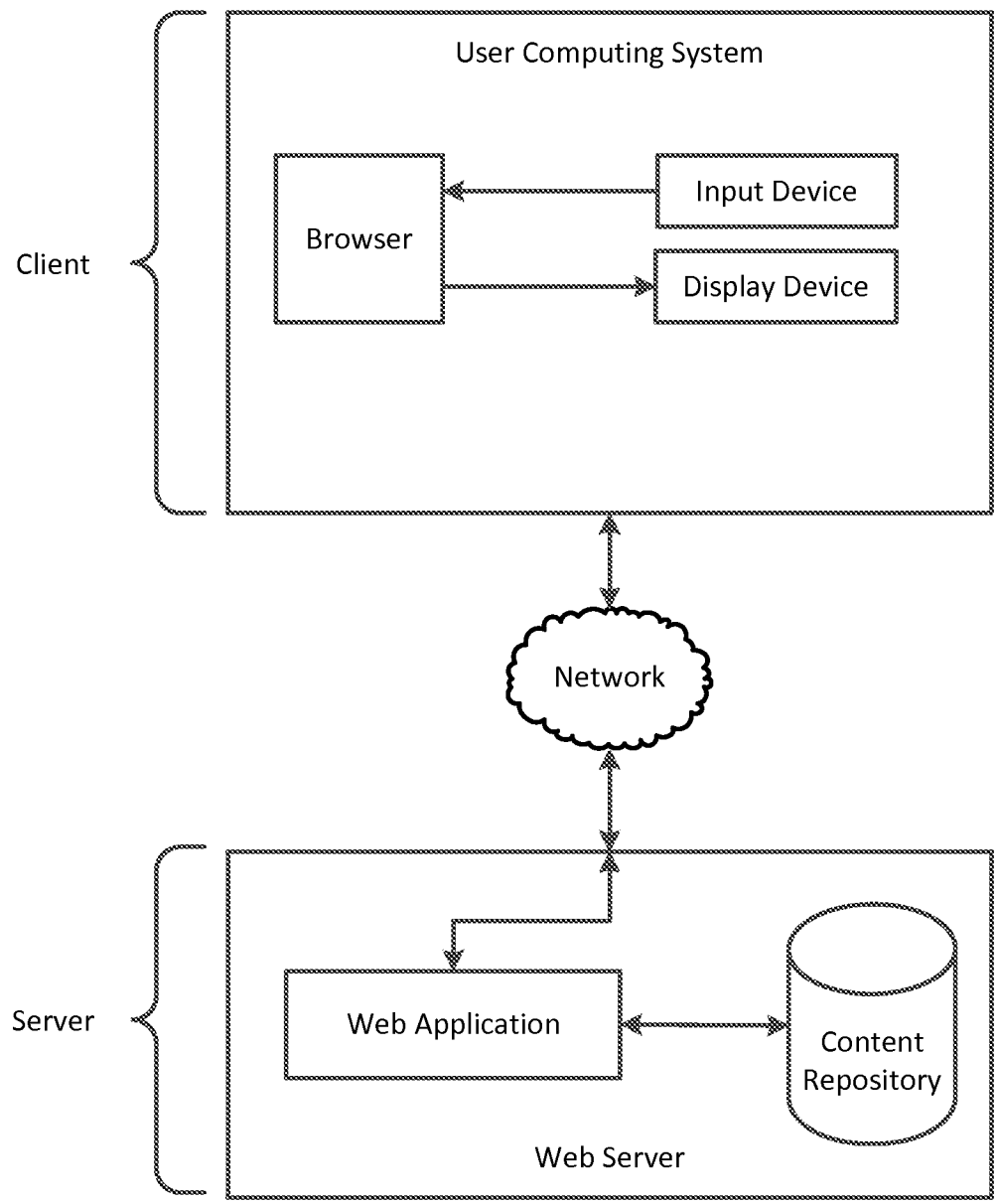
FIG. 1 illustrates an example user computing system configured in accordance with an embodiment of the present invention.

As used herein, the term "web page," in addition to its plain and ordinary meaning, includes a structured document written in HTML, XML (Extensible Markup Language) and/or another markup language that is delivered to and rendered by a web browser. Web pages can have, among other things, text, formatting information and links to other resources such as images, multimedia, and/or other web pages to be displayed by the web browser. Additionally, certain layout, typographic and color scheme information can be provided by Cascading Style Sheet (CSS) instructions, which can either be embedded in the web page or in a separately referenced file.

Commercial web browsers use the Document Object Model (DOM) as an interface for representing and interacting with objects in HTML and XML documents. As used herein, the term "object," in addition to its plain and ordinary meaning, includes individual components of a web page, such as HTML elements (defined by start and end tags), that have been parsed into the DOM by the browser. With the DOM, developers can build web pages, navigate their structure, and add, modify, or delete elements and content. Each web page component has one or more properties. As used herein, the term "property," in addition to its plain and ordinary meaning, includes a path to a location of the component (e.g., a Universal Resource Locator or URL) and/or a type of the component (e.g., text, image, etc.).

In the context of authoring or editing a web page, sometimes the developer is provided with additional information that is not normally displayed with the web page. Such additional information may include a path to the location of a web page component (e.g., a URL), the type of the component and/or any other information that may be useful during the editing process. This information may be provided, for example, by the web page authoring and/or editing tool(s). In some instances, it is desirable to visually separate the web page content, as viewed in the context of an end-user, from the additional information provided in the authoring context. Such visual separation, generally referred to herein as a context separated authoring environment, allows the developer to more clearly see the distinction between the authoring environment and the actual web page as it would normally appear outside of the authoring environment. For instance, to provide visualization of a web page, the HTML, JavaScript, CSS instructions and/or other components of the web page can be displayed in a separate user interface from the actual web page. The separate user interface may be provided in a different frame of the web browser window and/or in an entirely different browser window. However, although using different frames or windows permits visual separation of the web page from the additional information and other editing controls, there is no visual association between each individual web page component and the corresponding component in the authoring environment. Therefore, it is more difficult for the user to determine these associations while editing the web page.

General Overview

Techniques are disclosed for providing visual path resolution in a context separated authoring environment of a REST- and component-based content management system. In an embodiment, a web page editor associated with a REST-based CMS is activated for editing a web page having a plurality of Document Object Model (DOM) components. A structured document, such as an HTML, XML or other markup language-based document, is generated and configured to present, when rendered by a web browser, the components of the web page and at least a portion of the web page editor in a common frame of a browser window. The structured document is further configured to present, when rendered by the web browser, visual indications of regions of the web page that contain one or more of the components, such as by surrounding each region with dashed outlines. In response to receiving an input that selects one of the components (e.g., a mouse-enter event or appropriately placed touch screen tap associated with the region of the web page containing the respective component), the structured document is updated to present, when rendered by the web browser, information about a property of the selected component in the common frame of the browser window. The information can, in some embodiments, include a path to a location of the selected component (e.g., a Universal Resource Locator or URL) and/or a type of the selected component (e.g., text, image, etc.). In some embodiments, the information can be presented or displayed in the same region of the web page that contains the selected component, for example, as a layer overlaid upon the web page. Numerous configurations and variations will be apparent in light of this disclosure.

In one specific embodiment, the authoring environment can be activated through a global function call of a JavaScript console, a bookmarklet or other application interface. In the authoring environment, a web page is rendered in the same frame of a web browser window (e.g., as an inline frame or iframe) as a web page editor. Instead of, or in addition to, giving the developer the ability to interact directly with the content of the web page in the iframe, a layer is positioned on top of the iframe. This layer is part of the DOM in the web page editor frame. The layer detects all user interface interactions with the components of the web page. The components may be designated, for example, by a CSS class assigned to each component. The location of each component on the web page is visually indicated using, for example, a dashed line or other suitable marking. When a user selects one of the components via the user interface, the selected component is highlighted with a different visual indicator, such as a solid line and/or contrasting color (e.g., a solid red line), and additional information about one or more properties of the selected component is displayed in the region of the web page containing the selected component. For instance, in a specific embodiment, the path to the location of the component and/or the type of component is displayed. Each component may be selected, for example, when the user hovers a mouse pointer over the respective component (e.g., a mouse-enter event triggered by the web browser), and correspondingly deselected, for example, when the user moves the mouse pointer out of the region containing the respective component (e.g., a mouse-leave event). In some cases, when one component is selected, the visual indicators for the non-selected components are removed.

System Architecture

FIG. 1 illustrates an example system for visual path resolution in a context separated authoring environment of a REST- and component-based content management system configured in accordance with an embodiment. The system includes a user computing system and a web server communicatively coupled to the user computing system via a network. The web server hosts a content repository for storing various web resources, such as web pages and web page content. The user computing system includes a browser that can be used to access and interact with a web application executable by the server, and for accessing and changing web resources in the content repository. The browser interacts with one or more input devices, such as a keyboard and mouse, and one or more display devices. The web application may include, for example, a web content management system (WCMS), such as Adobe CQ5. The system may include additional components and still fall within the scope of the disclosed embodiments. The browser can be any of a number of browsers, including, for example, Microsoft Internet Explorer®, Mozilla Firefox®, Safari®, Google Chrome®, and Opera®. The user computing system can be configured to execute any of a number of operating systems, such as Microsoft Windows®, Mac OS®, Google Android® and any one of the Linux®-based operating systems. The user computing system can be implemented with any suitable computing device, such as a laptop, desktop, tablet computer, smartphone, or other suitable computing device capable of receiving input from a user and providing a GUI via the display. The content repository can be implemented, for example, with any suitable type of memory, such as a disk drive included in, or otherwise in communication with, the browser and/or the web application. Other suitable memories include flash memory, random access memory (RAM), a memory stick or thumb drive, USB drive, cloud storage service, etc. In a more general sense, any memory facility can be used to implement the data storage. The network can be any communications network, such as a local area network or the Internet, or any other public and/or private communication network. Such a system may be suitable, for example, for providing visual path resolution in a context separated authoring environment of a REST- and component-based CMS using techniques as variously described herein.

It will be appreciated that, in some embodiments, various functions performed by the browser, the web application, and the content repository, as described herein, can be performed by similar processors and/or storage devices in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. Various components of the system shown in FIG. 1, such as the browser and web application, can be implemented in software, such as a set of instructions (e.g. C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Use Cases

FIG. 2 illustrates an example graphical user interface of a web browser, such as the browser of FIG. 1, configured in accordance with an embodiment. As can be seen, the GUI can include a browser window for displaying a web page having several components, including, for example, a section of text or other content generally indicated at 100. It will be noted that the web page depicted in FIG. 2 is a DOM representation in which the formatted content of the web page is visible in the GUI, but the underlying markup language, scripts and/or style sheet instructions are not visible in the GUI. The DOM representation can be generated by the web browser in response to receiving and parsing a structured document that is generated by a web application (e.g., a CMS), such as the web application of FIG. 1.

Figure 3:
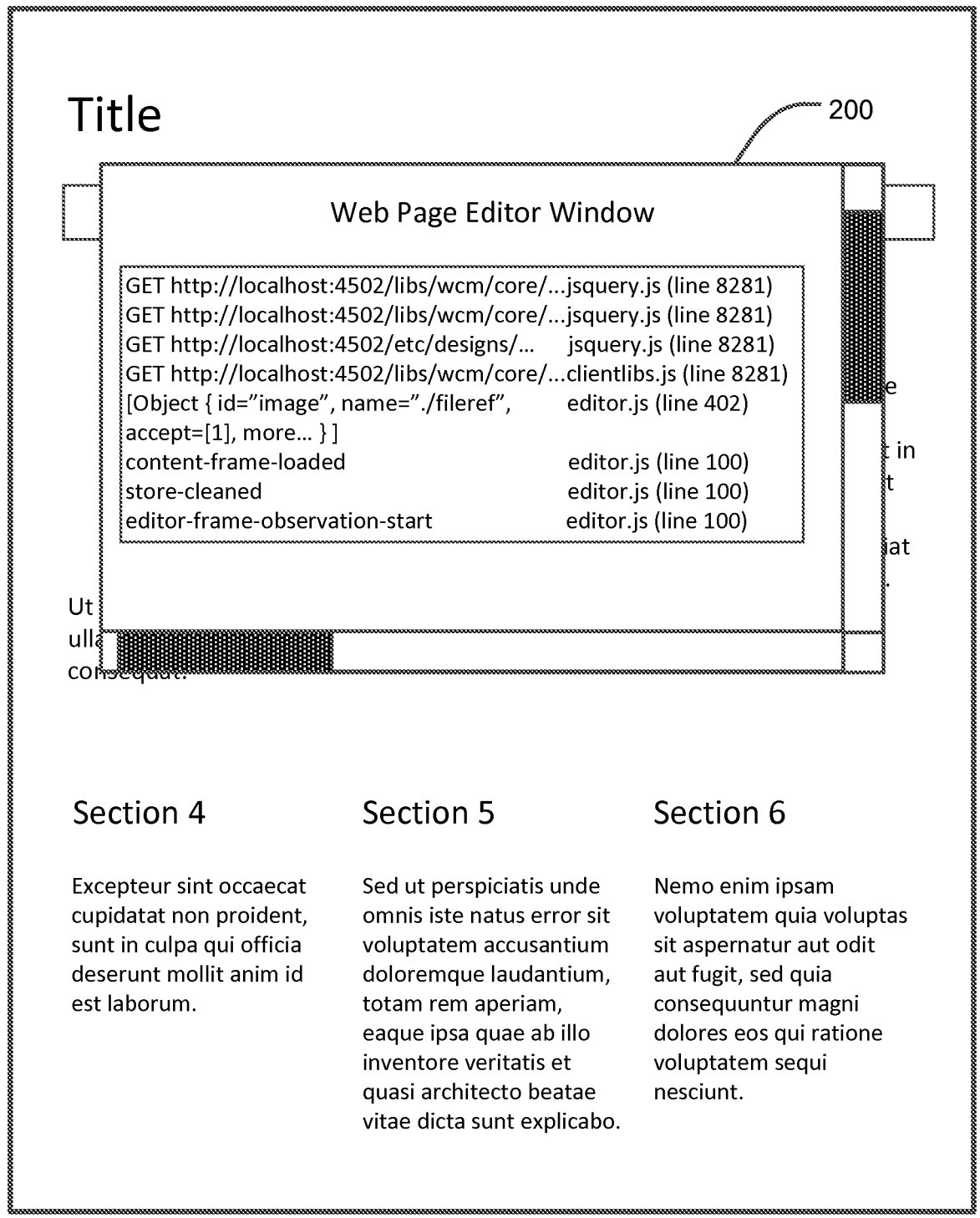
FIG. 3 illustrates a GUI-based web page editor for editing a web page.

FIG. 3 illustrates an example web page editor window 200 that can be used in conjunction with the example GUI depicted in FIG. 2. For instance, the web page editor window 200 may provide an interface that enables the user to view and modify the underlying markup language, scripts, style sheet instructions and/or other information associated with the web page components. As depicted in FIG. 3, the web page editor and the web page are located in separate browser windows, and each window lies in a different context; that is, the web page lies in an end-user context and the web page editor lies in an authoring or editing context. Changes made in the editing context can be reflected in the end-user context so that the user can see the effects of the changes as they appear on the web page. In particular, this configuration may obscure visibility of at least a portion of the web page, such as can be seen in FIG. 3 (e.g., section 100 may be obscured by the web page editor window), which can make it more difficult for the user to ascertain the associations between the components of the web page and the corresponding information displayed in the web page editor window 200. However, even if the web page is not obscured by the web page editor window 200, this configuration does not provide a visual association between the information provided in the web page editor window 200 and the corresponding components of the web page.

Figure 4:
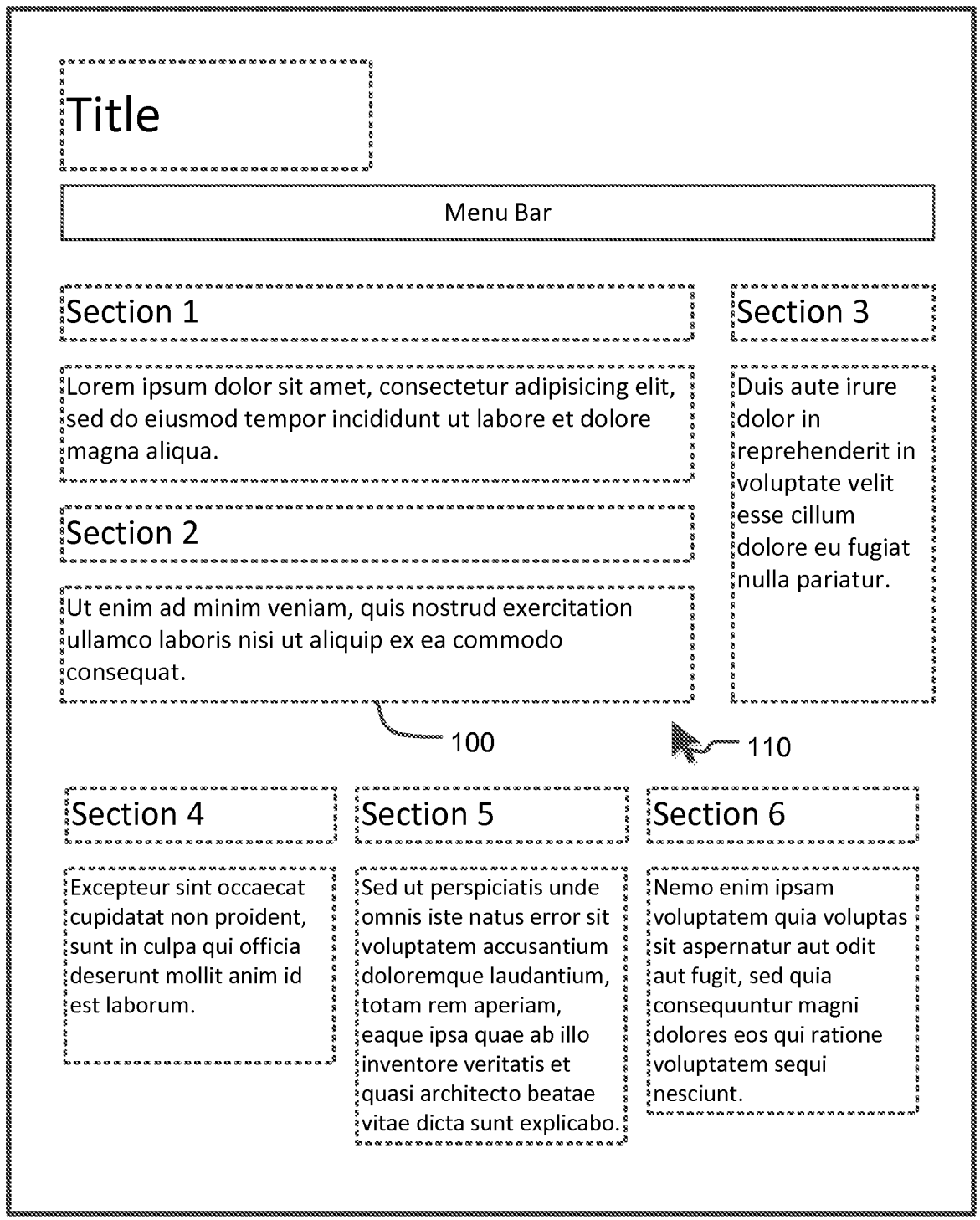
FIGS. 4 and 5 illustrate an example GUI-based web page editor for visual path resolution of a web page in a context separated authoring environment in accordance with an embodiment of the present invention.

FIG. 4 illustrates the example graphical user interface of FIG. 2 while a web page editor is active, according to an embodiment. The web page is displayed by a web browser by processing a structured document (e.g., an HTML document) that is configured to present the DOM components of the web page and the web page editor in a common frame of a browser window with visual indications of regions of the web page containing one or more of the DOM components. As can be seen in contrast to FIG. 2, the GUI displays visual indications of regions of the web page containing one or more of the components, including section 100. The visual indications can be displayed in the same frame or window as the web page, as defined in the structured document. In this example, the visual indications are dashed lines, although other suitable indications can be used. Also depicted is a mouse pointer 110, which in this example is located outside of all of the dashed regions. The visual indications do not form a part of the web page, but are displayed while the web page editor, or a user-activated sub-function thereof, is active. While displayed, the visual indications can make it easier to visualize the location of each component, such as section 100, while the user is working in a context separated authoring environment. The visual indications can be removed, for example, when the web page editor or sub-function is inactive, so that the web page can be seen in its normal appearance.

Figure 5:
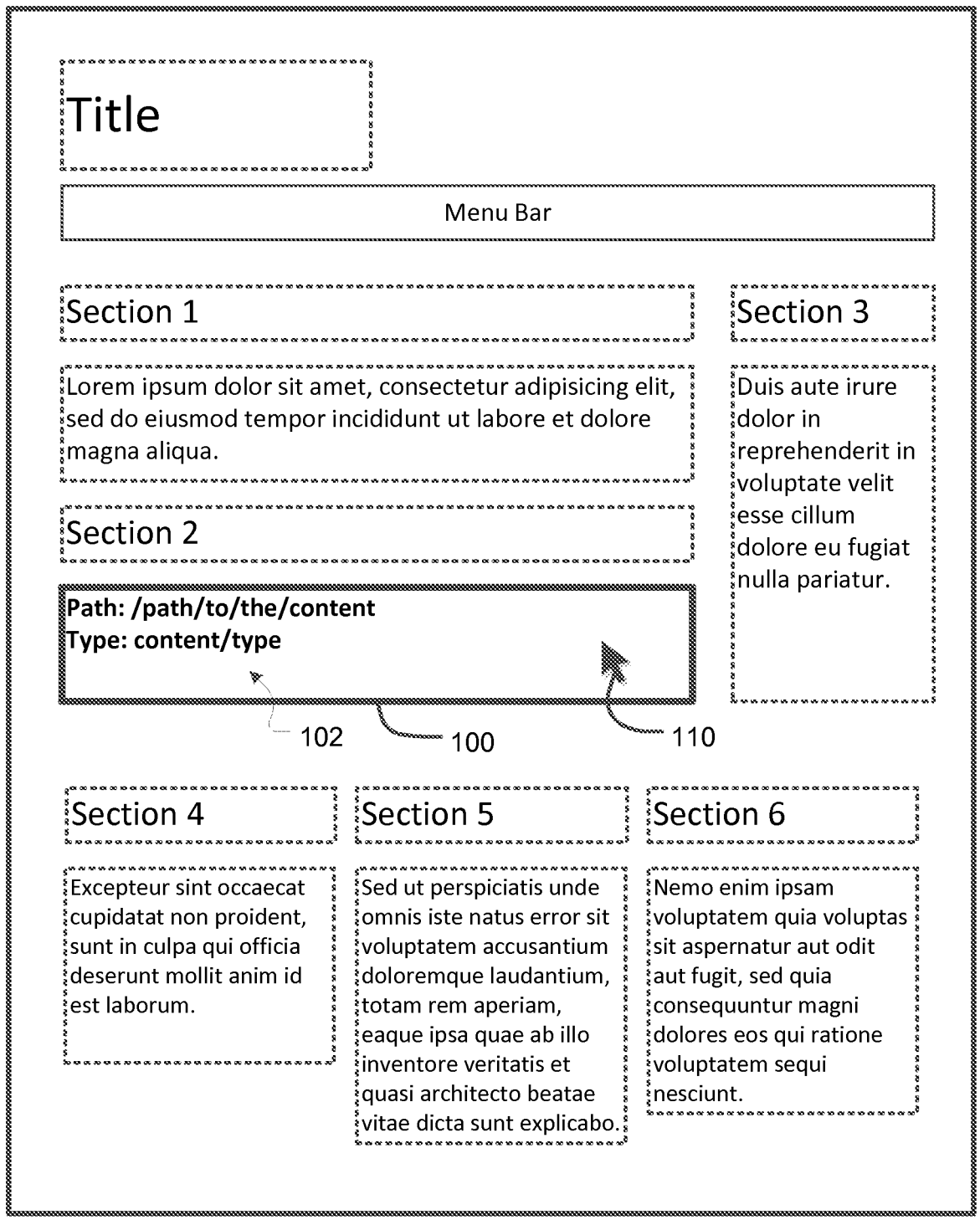

FIG. 5 illustrates the example graphical user interface of FIG. 4 while the web page editor is active and while one of the components is selected, according to an embodiment. In response to selecting the component, the structured document is updated to switch or toggle from presenting the selected DOM component to presenting information about a property of the selected DOM component in the common frame of the browser window. As can be seen in contrast to FIG. 4, the GUI switches or toggles from displaying the selected component to displaying information about a property of the selected component in section 100, generally indicated at 102. In this example, the component in section 100 is selected when the user moves the mouse pointer 110 inside the region of the web page containing section 100, which generates a mouse-enter event within the web browser. It will be understood that techniques other than a mouse-enter event can be used for selecting (or deselecting) a component of the web page (e.g., mouse click, keyboard entry, etc.). While the component is selected, the dashed line surrounding section 100 (such as depicted in FIG. 4) changes to a solid line, and the text of section 100 is obscured or otherwise covered up by the information. The information can be displayed in the same frame or window as the web page. In this manner, a visual association between the selected component and the information is presented to the user via the GUI. In some embodiments, the visual indication of a selected component can be any contrasting indication, such as a thick solid line, a solid line of a different color (e.g., red), or any other suitable indication that distinguishes the selected component from other non-selected components of the web page. The component in section 100 is deselected when the user moves the mouse pointer 110 outside the region of the web page containing section 100, which generates a mouse-leave event within the web browser. In this case, the structured document is updated to switch or toggle from presenting the information to presenting the deselected DOM component, at which time the GUI may, for example, return to the appearance of FIG. 4 by switching or toggling from displaying the information about the property of the component to displaying the component.

Figure 6:
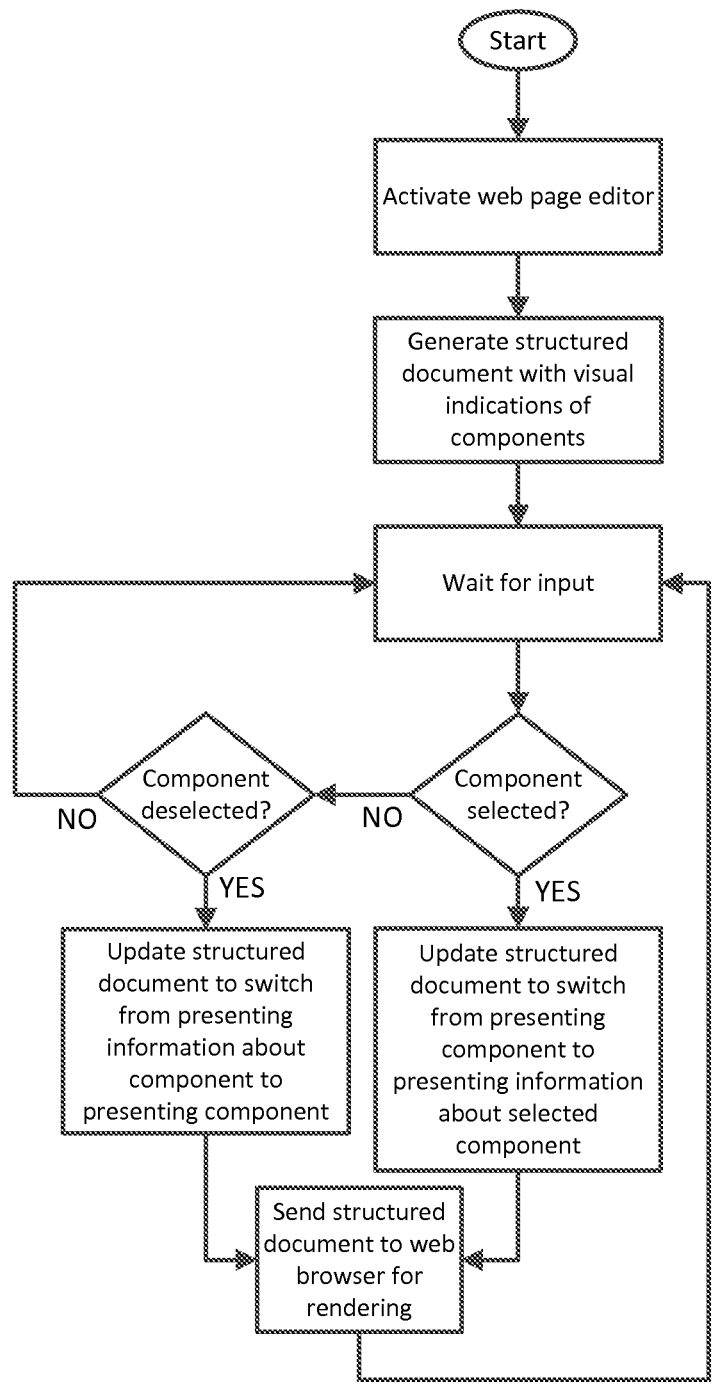
FIG. 6 illustrates an example methodology for visual path resolution in a context separated authoring environment in accordance with an embodiment of the present invention.

Example Methodology for Visual Path Resolution in a Context Separated Authoring Mode FIG. 6 illustrates a methodology for visual path resolution in a context separated authoring environment of a REST- and component-based content management system, according to an embodiment. This method can be carried out, for example, by the web application in the web server of FIG. 1. JavaScript or other suitable code can be used to implement the method. In one such embodiment, the methodology can be used in conjunction with a web page stored in a content repository, such as depicted in the example of FIG. 1. Such a web page may, for example, include HTML or XML code, JavaScript, CSS instructions, and/or other resources such as data, text, images, and multimedia which, when parsed by a web browser, can be used to form a plurality of DOM components.

The method begins by activating a web page editor associated with a REST-based CMS, which may, for example, be provided by the web application. The web page editor can include any application configured to permit a user to author or edit the web page. For example, the web page editor may include one or more tools, controls and/or interfaces that facilitate editing of the web page. The method continues by generating a structured document configured to present, when rendered by the web browser, the components of the web page and at least a portion of the web page editor in a common frame of a browser window with visual indications of regions of the web page containing one or more of the DOM components. This can be accomplished using HTML div tags at locations corresponding to the selected component in the structured document, or by using other suitable HTML tags or coding techniques. The visual indications may include, for example, dashed lines surrounding each region containing one or more of the components. In one specific embodiment, the web page editor includes a DOM layer that is coextensive with the frame containing the web page. The DOM layer, which resides in an authoring environment, is configured to detect inputs received from the web browser, such as the position of a mouse pointer relative to the components of the web page, which resides in an end-user environment. For example, when a user moves the mouse pointer inside a region containing one of the components, the web browser may generate a mouse-enter event that is received as an input selecting the respective component. Similarly, when the user moves the mouse pointed outside of the same region, the web browser may generate a mouse-leave event that is received as an input deselecting the respective component.

The method continues by waiting for an input that selects or deselects a component of the web page. If an input selecting the component is received, the structured document is updated to switch or toggle from presenting the selected DOM component to presenting information about a property of the selected component, such as a path to a location of the component and/or a type of the component. In one specific embodiment, the structured document is further configured to present the information in the same region of the web page containing the selected component. This can be accomplished by enclosing the information with HTML div tags at locations corresponding to the selected component in the structured document, or by using other suitable HTML tags or coding techniques. The structured document may, in some cases, be further updated to change the visual indication of the selected component. For example, the dashed line surrounding the region containing the selected component may be changed to a solid line and/or a line of contrasting color. Alternatively, if an input deselecting the component is received, the structured document is updated to switch or toggle from presenting the information about the property of the previously selected component to presenting the component. In either case, in one specific embodiment, the updated structured document is sent to the web browser for rendering. In this manner, the user is able to visualize the associations between the components of the web page and the information about the property or properties of the respective components while operating in a context separated authoring environment. The method can repeat indefinitely or until the web page editor is deactivated.

Numerous embodiments will be apparent in light of the present disclosure, and features described herein can be combined in any number of configurations. One example embodiment provides a computer-implemented method. The method includes activating a web page editor associated with a REST-based content management system (CMS) for editing a web page comprising a plurality of document object model (DOM) components, generating a structured document configured to present the DOM components of the web page and the web page editor in a common frame of a browser window with visual indications of regions of the web page containing one or more of the DOM components, and, in response to receiving an input that selects one of the DOM components, updating the structured document to switch or toggle from presenting the selected DOM component to presenting information about a property of the selected DOM component in the common frame of the browser window. In some cases, the method includes sending the structured document to a browser for rendering. In some cases, the structured document is further configured to present the information in the region of the web page containing the selected DOM component. In some cases, the structured document is further configured to present the information with a contrasting appearance to at least one other portion of the web page. In some cases, the property includes a path to a location of the selected DOM component and/or a type of the selected DOM component. In some cases, the visual indications include dashed lines surrounding each region. In some cases, the input that selects the identified DOM component is a mouse-enter or touch screen event associated with the region of the web page containing the selected DOM component. In some cases, the method includes, in response to receiving an input that deselects the selected DOM component, updating the structured document to switch or toggle from presenting the information to presenting the deselected DOM component. In some such cases, the input that deselects the identified DOM component is a mouse-leave or touch screen event associated with the region of the web page containing the selected DOM component. In some cases, each DOM component includes a Cascading Style Sheet (CSS) class selector. In some cases, some or all of the functions variously described in this paragraph can be performed in any order and at any time by one or more different user computing systems.

Another example embodiment provides a system having a storage and a processor operatively coupled to the storage. The processor is configured to carry out a process including activating a web page editor associated with a REST-based content management system (CMS) for editing a web page comprising a plurality of document object model (DOM) components, generating a structured document configured to present the DOM components of the web page and the web page editor in a common frame of a browser window with visual indications of regions of the web page containing one or more of the DOM components, and, in response to receiving an input that selects one of the DOM components, updating the structured document to switch from presenting the selected DOM component to presenting information about a property of the selected DOM component in the common frame of the browser window. In some cases, the process includes sending the structured document to a browser for rendering. In some cases, the structured document is further configured to present the information in the region of the web page containing the selected DOM component. In some cases, the structured document is further configured to present the information with a contrasting appearance to at least one other portion of the web page. In some cases, the property includes a path to a location of the selected DOM component and/or a type of the selected DOM component. In some cases, the visual indications include dashed lines surrounding each region. In some cases, the input that selects the one of the identified DOM components is a mouse-enter or touch screen event associated with the region of the web page containing the selected DOM component. In some cases, the process includes, in response to receiving an input that deselects the selected DOM component, updating the structured document to switch from presenting the information to presenting the deselected DOM component. In some cases, the input that deselects the one of the identified DOM components is a mouse-leave or touch screen event associated with the region of the web page containing the selected DOM component. Another example embodiment provides a non-transient computer program product having instructions encoded thereon that when executed by one or more processors cause a process to be carried out for performing one or more of the functions variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for providing visual path resolution in a REST-based content management system, the method comprising:

activating a web page editor associated with a REST-based content management system (CMS) for editing a web page comprising a plurality of document object model (DOM) components;

generating a structured document configured to present for display the DOM components of the web page and the web page editor in a common frame of a browser window with visual indications of regions of the web page containing one or more of the DOM components, the web page residing in an end-user context;

parsing, by a web browser, the DOM components of the web page residing in the end-user context to produce a DOM layer, the DOM layer being included in the web page editor residing in a context separated authoring environment that is different from the end-user context of the web page and configured to enable a user to interact with the DOM components of the web page via the web page editor, the DOM layer residing in the context separated authoring environment being configured to detect inputs received from the web browser;

overlaying the DOM layer upon the DOM components of the web page, the overlaid DOM layer being different from the DOM components of the web page and coextensive with the common frame of the browser window;

detecting, by the overlaid DOM layer residing in the context separated authoring environment via the web page editor, an input that selects one of the DOM components of the web page different from the DOM layer and residing in the end-user context; and in response to detecting the input that selects one of the DOM components, updating the structured document to switch from presenting for display the selected DOM component to presenting for display, in the common frame of the browser window and without modifying the web page, a link path to the selected DOM component in the REST-based content management system wherein the selected DOM component is obscured by the link path while the link path is displayed in the browser window.

2. The method of claim 1, further comprising sending the structured document to a browser for rendering.

3. The method of claim 1, wherein the structured document is further configured to present for display the link path in the region of the web page containing the selected DOM component.

4. The method of claim 1, wherein the structured document is further configured to present for display the link path with a differing visual indication to at least one other non-selected portion of the web page.

5. The method of claim 1, further comprising updating the structured document to switch from presenting for display the selected DOM component to presenting for display, in the common frame of the browser window, a type of the selected DOM component in the REST-based content management system.

6. The method of claim 1, wherein the visual indications include dashed lines surrounding each region.

7. The method of claim 1, wherein the input that selects the one of the identified DOM components is a mouse-enter or touch screen event associated with the region of the web page containing the selected DOM component.

8. The method of claim 1, further comprising, in response to receiving an input that deselects the selected DOM component, updating the structured document to switch from presenting for display the link path to presenting for display the deselected DOM component.

9. The method of claim 8, wherein the input that deselects the one of the identified DOM components is a mouse-leave or touch screen event associated with the region of the web page containing the selected DOM component.

10. The method of claim 1, wherein each DOM component includes a Cascading Style Sheet (CSS) class selector.

11. A system for providing visual path resolution in a REST-based content management system, the system comprising:

a storage; and a processor operatively coupled to the storage and configured to carry out a process comprising:

activating a web page editor associated with a REST-based content management system (CMS) for editing a web page comprising a plurality of document object model (DOM) components, the web page residing in an end-user context;

generating a structured document configured to present for display the DOM components of the web page and the web page editor in a common frame of a browser window with visual indications of regions of the web page containing one or more of the DOM components, the web page residing in an end-user context;

parsing, by a web browser, the DOM components of the web page residing in the end-user context to produce a DOM layer, the DOM layer being included in the web page editor residing in a context separated authoring environment that is different from the end-user context of the web page and configured to enable a user to interact with the DOM components of the web page via the web page editor, the DOM layer residing in the context separated authoring environment being configured to detect inputs received from the web browser;

overlaying the DOM layer upon the DOM components of the web page, the overlaid DOM layer being different from the DOM components of the web page and coextensive with the common frame of the browser window;

detecting, by the overlaid DOM layer residing in the context separated authoring environment via the web page editor, an input that selects one of the DOM components of the web page different from the DOM layer and residing in the end-user context; and in response to detecting the input that selects one of the DOM components, updating the structured document to switch from presenting for display the selected DOM component to presenting for display, in the common frame of the browser window and without modifying the web page, a link path to the selected DOM component in the REST-based content management system wherein the selected DOM component is obscured by the link path while the link path is displayed in the browser window.

12. The system of claim 11, wherein the process includes sending the structured document to a browser for rendering.

13. The system of claim 11, wherein the structured document is further configured to present for display the link path in the region of the web page containing the selected DOM component.

14. The system of claim 11, wherein the structured document is further configured to present for display the link path with a differing visual indication to at least one other non-selected portion of the web page.

15. The system of claim 11, wherein the process further comprises updating the structured document to switch from presenting for display the selected DOM component to presenting for display, in the common frame of the browser window, a type of the selected DOM component in the REST-based content management system.

16. The system of claim 11, wherein the visual indications include dashed lines surrounding each region.

17. The system of claim 11, wherein the input that selects the one of the identified DOM components is a mouse-enter or touch screen event associated with the region of the web page containing the selected DOM component.

18. The system of claim 11, wherein the process includes, in response to receiving an input that deselects the selected DOM component, updating the structured document to switch from presenting for display the link path to presenting for display the deselected DOM component.

19. The system of claim 18, wherein the input that deselects the one of the identified DOM components is a mouse-leave or touch screen event associated with the region of the web page containing the selected DOM component.

20. A non-transitory computer program product having instructions encoded thereon that when executed by one or more processors cause a process to be carried out for providing visual path resolution in a REST-based content management system, the process comprising:

activating a web page editor associated with a REST-based content management system (CMS) for editing a web page comprising a plurality of document object model (DOM) components, the web page residing in an end-user context;

generating a structured document configured to present for display the DOM components of the web page and the web page editor in a common frame of a browser window with visual indications of regions of the web page containing one or more of the DOM components;

parsing, by a web browser, the DOM components of the web page residing in the end-user context to produce a DOM layer, the DOM layer being included in the web page editor residing in a context separated authoring environment that is different from the end-user context of the web page and configured to enable a user to interact with the DOM components of the web page via the web page editor, the DOM layer residing in the context separated authoring environment being configured to detect inputs received from the web browser;

overlaying the DOM layer upon the DOM components of the web page, the overlaid DOM layer being different from the DOM components of the web page and coextensive with the common frame of the browser window;

detecting, by the overlaid DOM layer residing in the context separated authoring environment via the web page editor, an input that selects one of the DOM components of the web page different from the DOM layer and residing in the end-user context; and in response to detecting the input that selects one of the DOM components, updating the structured document to switch from presenting for display the selected DOM component to presenting for display, in the common frame of the browser window and without modifying the web page, a link path to the selected DOM component in the REST-based content management system such that the selected DOM component is obscured by the link path while the link path is displayed in the browser window.

* * * * *